Jan. 18, 1955  A. G. SMITH  2,699,580
CANOPY SEAL AND PROCESS FOR MAKING THE SAME
Filed Feb. 9, 1950  2 Sheets-Sheet 1

ALBERT G. SMITH,
INVENTOR.

BY Lyon & Lyon
ATTORNEYS

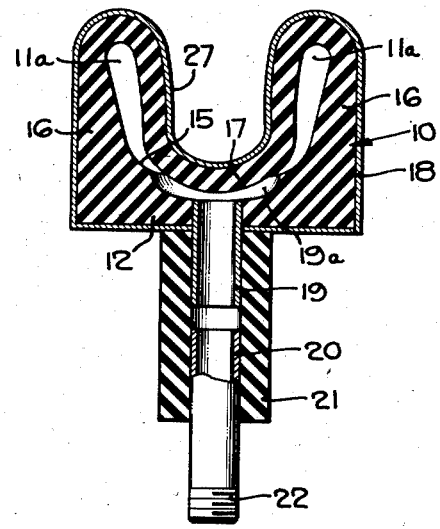
Fig. 5.
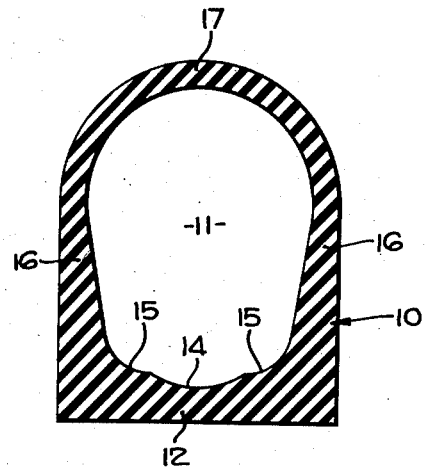
Fig. 6.
Fig. 8.
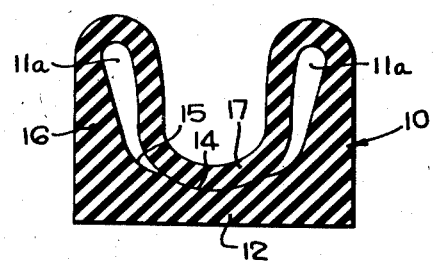
Fig. 7.
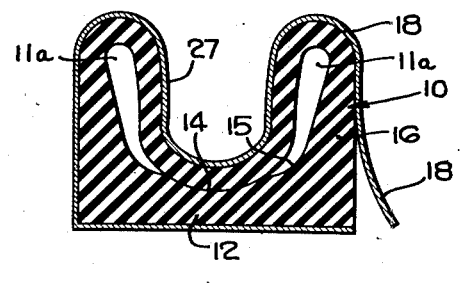
ALBERT G. SMITH,
INVENTOR.
BY Lyon & Lyon
ATTORNEYS

United States Patent Office 2,699,580
Patented Jan. 18, 1955

2,699,580

CANOPY SEAL AND PROCESS FOR MAKING THE SAME

Albert G. Smith, Long Beach, Calif., assignor to Kirkhill Rubber Company, Los Angeles, Calif., a corporation of California Application February 9, 1950, Serial No. 143,242

2 Claims. (Cl. 20—69)

This invention relates to aircraft canopy seals and has particular reference to an improved pneumatic canopy seal and to a process for making the same.

The requirements of modern aircraft, particularly jet-powered airplanes, which operate at high speeds and high altitudes, necessitate the use of efficient means for sealing the cockpit against air leakage. The problem is complicated by the fact that the canopy or plastic "bubble" over the cockpit is used as a means of access to the airplane, and hence the closure between the fuselage and the canopy cannot be a permanent one, but must be easily and quickly broken and resealed.

One of the main objects of my invention is, therefore, the provision of a novel canopy seal of the above described character.

Another object of my invention is to provide a novel canopy seal which will effectively secure the cockpit of an airplane against air leakage even though the two surfaces to be sealed have irregularities therein or are otherwise not uniformly spaced.

Another object of my invention is to provide a pneumatic canopy seal in the form of a tube of resilient material which is provided with a continuous air channel, the channel remaining open for the passage of air therethrough even though the tube may be twisted and distorted while in operative position.

Another object of my invention is to provide a novel pneumatic canopy seal which may be quickly inflated and deflated.

A further object of my invention is to provide a novel process for making such pneumatic canopy seals.

Other objects and advantages of my invention it is believed will be apparent from the following detailed description of a preferred embodiment thereof as illustrated in the accompanying drawings.

In the drawings:

Figure 5 is a vertical sectional view of my invention and illustrating the air inlet means.

Figures 6, 7 and 8 are vertical sectional views illustrating the canopy seal as it appears during the successive steps of my process for making the same.

Figure 2:
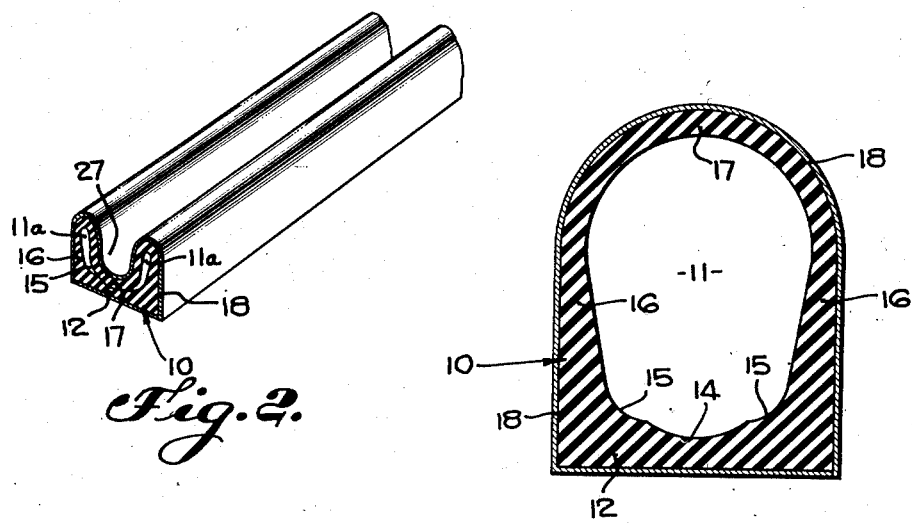
Figure 2 is a fragmentary perspective view of a preferred embodiment of my invention.
Figure 3:
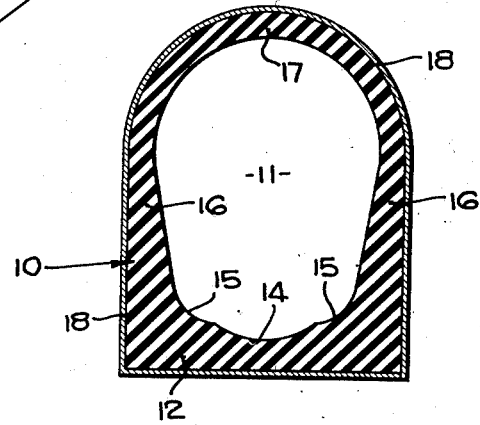
Figure 3 is a vertical sectional view of my canopy seal illustrating the shape thereof when completely inflated.
Figure 4:
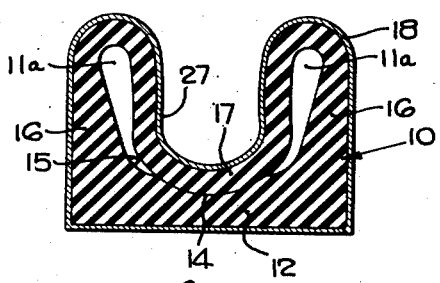
Figure 4 is a vertical sectional view of my canopy seal illustrating the shape thereof when completely deflated.

Referring now to the drawings, it will be seen that a preferred embodiment of my invention includes a continuous strip or tube 10 of resilient material having a longitudinal air chamber or channel 11 which extends throughout the entire length of the tube. The normal or deflated cross-section of the tube is best shown in Figures 2 and 4, illustrating that the tube when unstressed normally tends to assume a U-shaped cross-section with a flat-bottomed base portion 12. It will be observed that even in this fully deflated position the air chamber 11 is still present in the form of a pair of chambers or channels 11a. The particular shape of the tube walls is best described with reference to Figure 3 which illustrates the tube as fully inflated. It should be noted that the resilient material is of sufficient stiffness that the walls are not appreciably distorted or stretched in this position. In this connection it is apparent from an inspection of Figures 3 and 4 that the perimeter of the tube cross section does not increase upon inflation of the tube, that is, the perimeter is substantially the same when the tube is both in the deflated and inflated positions. The base portion or mounting base 12 is relatively thick and has a longitudinal, curved depression or groove 14 therein interposed between a pair of secondary grooves 15. The outer faces of the side walls 16 are vertical; the inner faces progressively decreasing in width in an upward direction until they merge with the inner face of the semi-circular top wall or sealing dome 17 which is of constant width and relatively thin with respect to the mounting base. In the deflated position of Figure 4, the dome 17 forms a longitudinal reentrant portion as shown.

I prefer to encase and bond the tubing 10 in a stocking or sleeve 18, which may be any loosely knitted or stitched fabric, to provide a degree of surface rigidity and improved wearing qualities.

Means are provided to admit or release air to or from the channel 11, and as shown in Figure 5 this may include the nipples 19 and 20 enclosed by a resilient bushing 21. The nipple 20 is provided with a conventional air valve (not shown) and external threads 22 to which an air supply hose may be secured. The area of the base 12 adjacent the upper end of nipple 19 is indented as at 19a to provide a path for escaping air even though the dome 17 is in the completely collapsed position.

Figure 1:
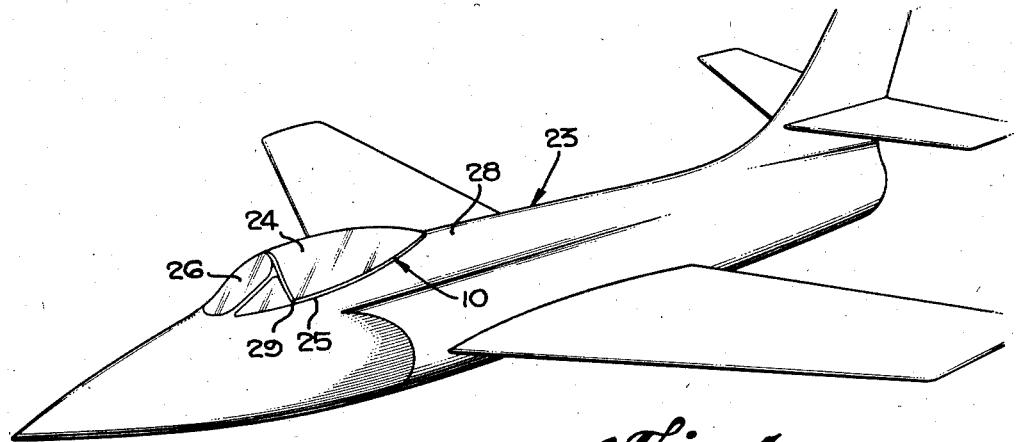
Figure 1 is a perspective view of an airplane in which is installed a preferred embodiment of my invention.

Figure 1 illustrates the sealing tube 10 installed on an airplane 23 having a canopy 24. The base portion 12 of the tube 10 is attached by adhesive or otherwise secured to the cockpit edge 25 and to the windshield 26 by means (not shown) familiar to those skilled in the art. The edges of the canopy 24 are seated in the U-shaped groove 27 formed by the top wall 17 when the tube 10 is in the normal deflated position, and the canopy is releasably attached to the fuselage 28 by conventional means (not shown).

When in use the tube 10 is inflated with air or an inert gas such as nitrogen, thus forming a tight seal, since the flexible sealing dome 17 is forced upwardly against the edges of the canopy and the walls are under compression. It is to be understood that the tube will not necessarily reach the full expanded position shown in Figure 3 since upward movement of the canopy is restricted by the attaching means, and also, the cockpit edge and the edges of the canopy may not be uniformly spaced or mating surfaces. The seal may be quickly broken by deflating the tube 10, and this is facilitated by the fact that even when fully deflated the channels 11a are still present. That is, it often happens that one or more portions of the seal become deflated sooner than others, and in order to prevent the tube sealing itself at those points with a consequent blocking off of the outrushing air, the channels 11a are provided. By this means, even though it may be necessary to twist the tube 10 as at 29 (Figure 1) in installing it, a continuous air channel is provided. These channels 11a also facilitate inflation of the tube, since they quickly become filled with air under pressure which exerts lateral forces throughout the entire length of the tube to push the top wall 17 upwardly.

Figures 6, 7 and 8 illustrate the shape and construction of the tube 10 during successive steps in a preferred process for making the same. The starting or base material, which may be natural or synthetic rubber which is compounded but not vulcanized, is first extruded in the shape shown in Figure 6. It is then set cured or vulcanized in the normally deflated shape shown in Figure 7. The third step is to apply the fabric sleeve 17 by wrapping it completely about the outer surface of the tube 10 as shown in Figure 8. Finally, the encased tube is given a finish cure to bond the sleeve to the tube.

Having fully described my invention, it is to be understood that I do not wish to be limited to the details herein set forth, but my invention is of the full scope of the appended claims.

I claim:

1. A sealing element comprising a member having a continuous recess therein; said member including a cover element disposed opposite said recess, said cover having a flexible portion receivable in said continuous recess, the flexible portion of said cover being inflatable to provide a sealing means; and groove means in said recess remote from said flexible portion and communicating with the exterior of said member to avoid entrapment of fluid upon deflation of said flexible portion.

2. A sealing arrangement comprising a member having a continuous recess therein; said member including a flexible cover portion disposed opposite said recess and adapted to lie against said recess; means for supplying inflating fluid to extend said flexible cover portion to provide an inflated sealing means, and groove means in the surface of said recessed portion and communicating with the exterior of said member whereby when said flexible cover portion is against said recess said groove means remain unobstructed to avoid entrapment of inflating fluid upon deflation of said flexible cover portion.

References Cited in the file of this patent

UNITED STATES PATENTS

| Number | Name | Date |
|---|---|---|
| 1,958,131 | Davidson | May 8, 1934 |
| 2,088,909 | Jaubert | Aug. 3, 1937 |
| 2,202,042 | Blout | May 28, 1940 |
| 2,301,963 | Marple et al. | Nov. 17, 1942 |
| 2,306,990 | Essl | Dec. 29, 1942 |
| 2,371,586 | Schwartz | Mar. 13, 1945 |
| 2,401,624 | Petter et al. | June 4, 1946 |
| 2,414,009 | Baird | Jan. 7, 1947 |